(12) United States Patent
Friesen et al.

(10) Patent No.: US 7,472,926 B2
(45) Date of Patent: Jan. 6, 2009

(54) GAME TICKET CONSTRUCTION

(75) Inventors: Valerie Merle Friesen, Winnipeg (CA);
Terry Della Lorraine Masson, Winnipeg (CA); Michael John Brickwood, Winnipeg (CA); Lyle Harold Scrymgeour, Oakbank (CA)

(73) Assignee: Pollard Banknote Limited Partnership, Winnipeg, Manitoba (CA)

( * ) Notice: Subject to any disclaimer, the term of this patent is extended or adjusted under 35 U.S.C. 154(b) by 260 days.

(21) Appl. No.: 11/211,086

(22) Filed: Aug. 25, 2005

(65) Prior Publication Data
US 2006/0022451 A1    Feb. 2, 2006

Related U.S. Application Data

(63) Continuation of application No. 10/736,228, filed on Dec. 16, 2003, now abandoned.

(51) Int. Cl.
*B42D 15/00* (2006.01)
*B42D 15/10* (2006.01)

(52) U.S. Cl. ........................ 283/100; 283/102

(58) Field of Classification Search ............. 283/63.1, 283/72, 94, 98–101, 103, 105, 106, 901, 283/903; 273/139, 138.1, 26, 9; 428/201
See application file for complete search history.

(56) References Cited

U.S. PATENT DOCUMENTS

| 2,310,965 A | * | 2/1943 | Leavy et al. ............... 428/88 |
| 4,174,857 A | | 11/1979 | Koza |
| 4,191,376 A | * | 3/1980 | Goldman et al. ........... 273/139 |
| 4,993,753 A | * | 2/1991 | Weeks ...................... 283/102 |
| 5,193,851 A | | 3/1993 | Honegger |
| 5,217,258 A | | 6/1993 | Sanderson |
| 5,253,899 A | | 10/1993 | Greenwood |
| 5,437,476 A | | 8/1995 | Hutchinson |
| 5,562,284 A | | 10/1996 | Stevens |
| 5,791,990 A | * | 8/1998 | Schroeder et al. ........... 463/17 |
| 5,924,740 A | * | 7/1999 | Romans .................... 283/100 |
| 6,145,885 A | | 11/2000 | Scrymgeour et al. |
| 6,234,477 B1 | | 5/2001 | Scrymgeour et al. |
| 6,308,991 B1 | | 10/2001 | Royer |
| 6,347,794 B2 | | 2/2002 | Scrymgeour et al. |
| 6,494,975 B1 | | 12/2002 | Scrymgeour et al. |
| 2001/0002079 A1 | * | 5/2001 | Scrymgeour et al. ..... 273/138.1 |
| 2003/0098579 A1 | | 5/2003 | Speyer |
| 2003/0218331 A1 | | 11/2003 | Yesser |
| 2005/0127662 A1 | * | 6/2005 | Friesen et al. ............... 283/49 |

FOREIGN PATENT DOCUMENTS

| CA | 2449570 | 3/2004 |
| CA | 2451788 | 5/2004 |
| WO | WO 98/57715 | 12/1998 |

* cited by examiner

*Primary Examiner*—Dana Ross
*Assistant Examiner*—Pradeep C Battula
(74) *Attorney, Agent, or Firm*—Adrian D. Battison; Ade & Company Inc.

(57) ABSTRACT

A game ticket construction is formed by laminating two substrate sheets by a band of adhesive between the sheets across a center line so as to form an initially flat construction which can be folded into a four page eight surface booklet. A plurality of different games, each defined by game indicia some or all of which are covered by a scratch-off layer are printed, one onto each of the six surfaces except the first and last which carry promotional material.

16 Claims, 3 Drawing Sheets

GAME TICKET CONSTRUCTION

This application is a continuation of application Ser. No. 10/736,228, filed Dec. 16, 2003 now abandoned.

The present invention relates generally to the field of game or lottery tickets and more particularly to a combined ticket assembly which is formed in two laminated sections which can be opened to form a series of surfaces for receiving game indicia.

BACKGROUND OF THE INVENTION

Lottery tickets are well known and widely sold and typically comprised of a sheet material of paper or card stock on which is printed lottery information and various indicia for the playing of one or more games. Many such games are instant win type games where the player can play the game or games by carrying out various functions, for example, opening pull tabs on a break-open ticket. Such tickets are also known variously as pull-tabs, pickle cards, jar tickets, hard cards and charitable gaming tickets.

Break-open tickets are typically constructed by printing a sheet containing multiple combinations of lottery indicia thereon. This sheet is then cut into sections. The opposite side of this sheet includes prize categories, serial number etc. A second sheet which contains removable tabs or break-open windows is then mounted onto the card stock such that the break-open windows overlap the lottery indicia. However, break-opens prepared in this manner have the disadvantages that they are cumbersome to prepare, have a limited set of winning symbols and require manually checking at the time of redemption.

U.S. Pat. No. 4,174,857 (Koza) and U.S. Pat. No. 5,253,899 (Greenwood) each disclose a combined ticket construction in which a second layer is applied or folded over the basic ticket to improve security. U.S. Pat. No. 5,562,284 discloses a break-open ticket with a second level of break-open. U.S. Pat. No. 5,217,258 (Sanderson) discloses a two sided break-open ticket where the windows are arranged back to back opening onto a single center sheet carrying the game data.

As shown in published PCT International application No. WO 98/57715 published 23 Dec. 1998 of the present applicants there is provided a pouched lottery ticket which is supplied in a fan folded continuous strip arrangement for separating each ticket from the next at a dispensing station. The disclosure of this publication may be referred to for further information.

In U.S. Pat. No. 6,234,477 assigned to the present assignee and issued May 22, 2001 is disclosed a construction of lottery ticket which utilizes variable image printing techniques in combination with lamination of two substrate sheets together to form what is initially a common pouch construction with the game indicia on the inside surface where the sheets can be separated, each from the other, to form in effect two separate tickets.

SUMMARY OF THE INVENTION

It is one object of the present invention to provide a lottery ticket construction which provides a larger surface area on which a larger and/or more complex game or games can be applied.

According to a first aspect of the invention there is provided a game ticket construction for playing of one or more games by a player comprising:

a first substrate sheet material having a front surface and a rear surface;

a second substrate sheet material having a front surface and a rear surface;

the first substrate sheet being arranged with the rear surface thereof overlying the front surface of the second substrate sheet;

and fastening material fastening the overlying first and second substrate sheets together along a line extending thereacross;

such that the first substrate sheet can be folded about the line to bring two parts of the front surface thereof together;

and the second substrate sheet can be folded around the first substrate sheet to bring the front surface of two parts of the second substrate sheet into contact with the rear surface of respective ones of the parts of the first substrate sheet;

so as to form a booklet of four sheets and eight surfaces defined by the two parts of the first substrate sheet and the two parts of the second substrate sheet;

with the two parts of the rear surface of the second substrate sheet exposed as outside surfaces of the booklet;

promotional graphics printed on at least one part of said rear surface of the second substrate sheet;

game information printed on at least some of the eight surfaces;

and game indicia printed by variable image printing onto at least some of the eight surfaces, some or all of the game indicia being covered by a layer of scratch-off material removable by the player.

While the construction defined above is stated to have four parts and eight surfaces, it will be appreciated that a third substrate sheet, or more, could be included and laminated by a fastening material to the front of the second, to form a construction of six parts and twelve surfaces.

It is preferred that the first and second substrates are coextensive since this construction best utilizes the materials available and forms a construction which can be easily handled, but it is not essential that the sheets be coextensive and they can be of different sizes or offset.

It is also preferred that the joining or fold line is arranged along a mid line of the first and second substrate sheets such that the two parts of each of the first and second substrate sheets are of the same dimensions and coextensive. However again ticket constructions of different shape and character can be formed by offsetting the line to one side or at an angle. However it is not intended nor included that the joining line be at one edge since this would prevent the folding action which is important in this construction.

Yet further, the first and second substrate sheets are preferably rectangular, but other shapes including circular, polygonal may be used to generate ticket constructions of a more unusual character.

Preferably, as commonly used in the ticket printing industry, the fastening material comprises a band of adhesive. However other fastening techniques such as stitching may be used.

Where adhesive is used, this is preferably located solely between the first and second substrate sheets so that the front surface of the first substrate sheet is free from adhesive. This allows the construction to remain flat before folding. The band of adhesive is preferably continuous.

In order to maximize the appearance or image to the customer of a booklet, each surface which has a game indicia printed thereon has the game indicia unrelated to those game indicia on each of the other surfaces so as to form a booklet of different games. However this is not essential and the game indicia on associated or adjacent pages may be used to provide a larger surface for a common game.

Preferably each part of the rear surface of the second substrate sheet which forms the front and rear respectively of the booklet when folded is free from game indicia.

In order to maximize the use of the surface area, preferably at least the first substrate sheet has game indicia on each of the four surfaces defined by the two parts thereof and more preferably each of the surfaces of the parts of the first and second substrate sheets has game indicia thereon with the exception of the rear surface of the second substrate sheet defining the first and last surfaces of the booklet.

Preferably the first and second substrate sheets are supplied in an initial condition for dispensing in a flat unfolded condition. This allows the tickets to be handled in conventional packaging and dispensing systems used for single ply or other laminated constructions.

Preferably the game ticket constructions are connected each to the next to form a continuous row of the game ticket constructions with a transverse row of perforations dividing each from the next for separation by tearing of the tickets for dispensing.

Preferably the connected game ticket constructions are fan folded with a fold at a front edge of each game ticket construction being in a direction opposite to a fold at a rear edge of each game ticket construction so that the game tickets constructions lie with the first and second substrates flat and each on top of and parallel to the next for dispensing.

The game provided on each substrate sheet may be for prizes both monetary and product related or may be merely for entertainment where no gambling or prize is involved. The type and value of any prizes can vary widely. The games may be pre-determined, otherwise known as "instant win" tickets or may include elements of skill or chance. The games may include a scratch-off-coating which is convenient and effective particularly for instant win type game tickets, but other types of games which do not include scratch-off may be used.

The games concerned are preferably instant win type games where the result is entirely predetermined, since such games are generally preferred in a lottery situation in order to ensure that the total winnings is predetermined. However the present invention is not limited to the type of game to be played and can include probability or other games which include game indicia covered by a scratch-off coating.

The construction may also be used in situations where the main objective is for other purposes than gambling such as in promotional games or games of fun for children or others where no gambling or prizes are involved.

Many such tickets are used directly in a lottery situation so that the tickets have no other relevance other than the playing of the lottery or game by which the player may win monetary or other prizes as part of the lottery or gaming situation.

However more attention has been recently given to the use of such tickets as promotional items used by manufacturers of other products to enhance the sale of the product.

BRIEF DESCRIPTION OF THE DRAWINGS

One embodiment of the invention will now be described in conjunction with the accompanying drawings in which.

In the drawings like characters of reference indicate corresponding parts in the different figures.

DESCRIPTION OF THE PREFERRED EMBODIMENTS

Figure 1:
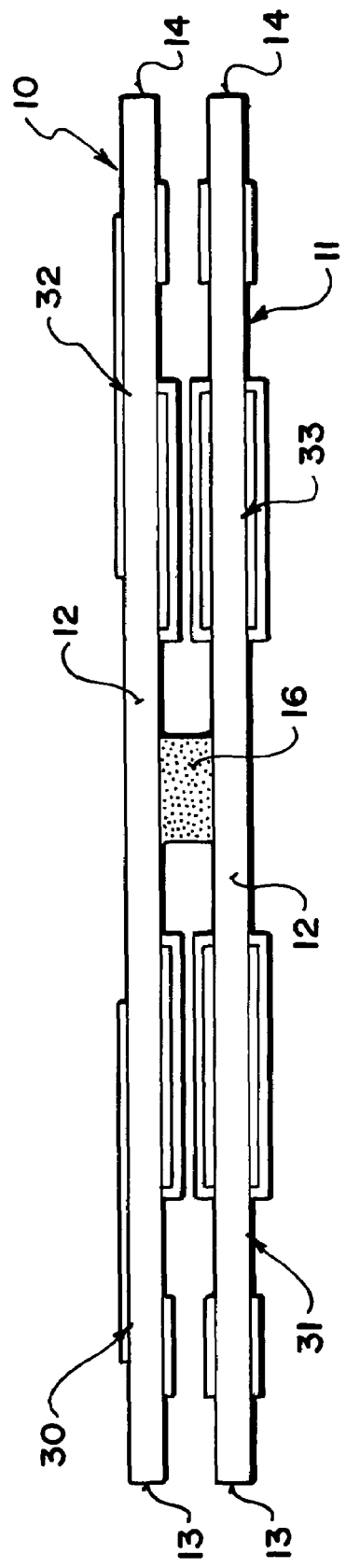
FIG. 1 is a cross-sectional view of one example of lottery ticket construction according to the present invention showing the ticket construction in an initial flat condition as formed and supplied for dispensing.

The ticket construction shown in the Figures comprises a first substrate sheet 10 and a second substrate sheet 11. The substrate sheets are coextensive and overlying. In the example shown the co-substrate sheets are rectangular. The substrate sheets thus define top edges 12 and side edges 13 and 14 together with a bottom edge 15. These edges are directly overlying. A band 16 of an adhesive material is located between the two substrate sheets along a line joining the top edge 12 to the bottom edge 15 and spaced from both the side edges 13 and 14 so as to connect the substrate sheets together at the band of adhesive, leaving the substrate sheets unconnected at other areas outside the band of adhesive.

In the example shown the band of adhesive is located along a centre line of the top and bottom edges so that it divides the two substrate sheets into two separate halves or parts.

It will be appreciated that other shapes of substrate sheet can be used other than rectangular. It will be appreciated that the substrate sheets do not need to be directly overlying so that one may be a different shape or different size from the other. It will be appreciated that the band of adhesive does not need to be located directly along the centre line but can be offset from that centre line so that one part of the sheet so formed on one side of the band of adhesive is a different size from that on the other size.

The band of adhesive is relatively narrow and is in effect as narrow as possible so as to avoid interfering with the area of the substrate sheets which is free from the adhesive and thus exposed to the user.

Figure 3:
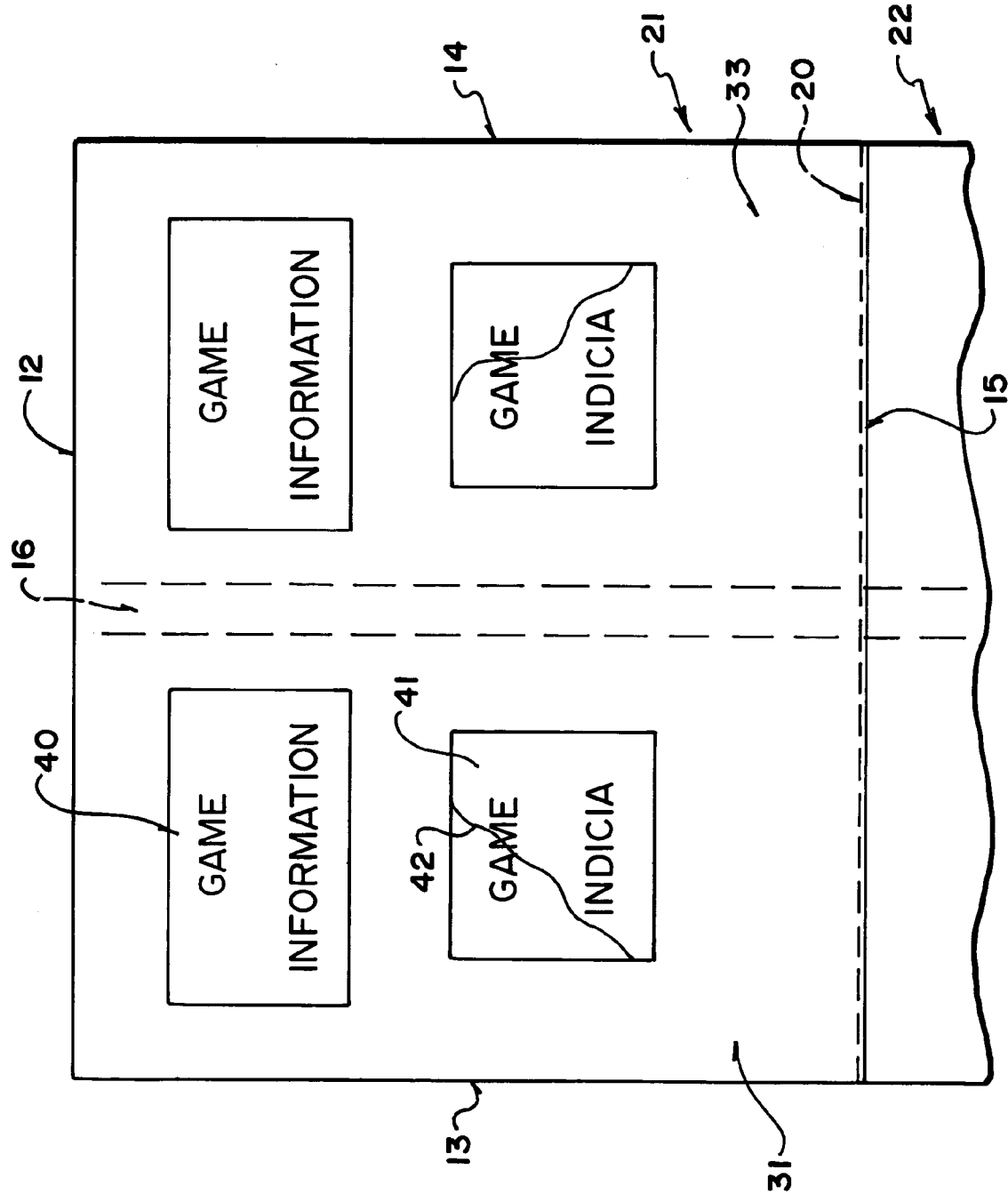
FIG. 3 is a front view of the lottery ticket construction of FIG. 1 showing the ticket in the opened condition.

The substrate sheets are supplied in a flat condition. The adhesive band is as thin as possible so that it allows the substrate sheets to lie directly on one on top of the next. Thus in the flat condition, the substrate sheets form in effect a single ticket construction defined by two laminated sheets which is thus a little different from conventional lottery ticket constructions in is ability to be handled and supplied in the flat condition. The two substrate sheets form part of a continuous strip of the substrate sheets separated at transverse perforation lines 20 so as to form, as shown in FIG. 3, a first ticket construction 21 followed by a second ticket construction 22 divided by the perforation line 20. The ticket constructions as is conventional, can be supplied in fan-folded condition with the folds being located at the perforation lines 20. The fact that the ticket is formed by two overlying sheets does not interfere with the fan folding action or the supply of the tickets using conventional dispensing systems. The ticket may be wider than many conventional tickets but it will be appreciated that conventional tickets vary in width of a large range.

Figure 2:
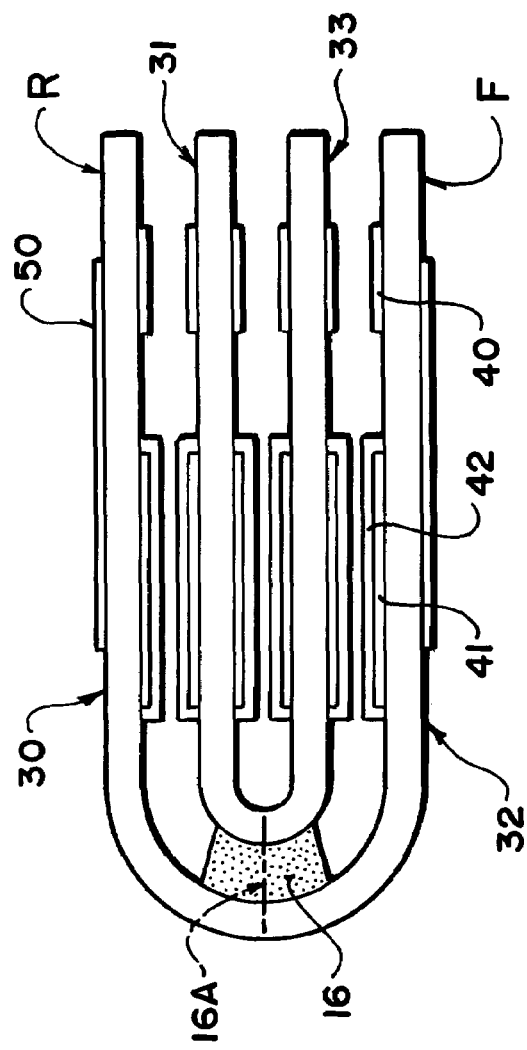
FIG. 2 is a cross sectional view of the lottery ticket of FIG. 1 showing the construction in the folded condition for the player.

The complete construction as shown in FIG. 1 therefore provides four separate sheet parts 30, 31, 32 and 33 each of which has two surfaces defined by a rear surface and a front surface. As shown in FIG. 2, the flat construction can be folded into a folded condition along a centre line 16A by folding at the band of adhesive 16. This arranges the sheet parts in stacked condition as shown in FIG. 2. The construction therefore forms a booklet of four sheet parts defining eight separate surfaces or pages onto which indicia are printed.

Prior to the assembly of substrate sheets into the flat condition shown in FIG. 1, the sheets are printed with the necessary game information and game indicia for the playing of games printed onto the selected surfaces of the sheet parts. Thus as shown in the Figures, each of the surfaces with the exception of the front surface F and the rear surface R of the booklet carries game information 40 and game indicia 41 where the game indicia are covered by a scratch-off coating 42 shown schematically and partly removed. The game information provides data relating to the game for the player. The game indicia provides actual playing game indicia by which the player can play the particular game using the game information as rules or other data necessary for the playing of the game. Many different types of games can be formed using this construction of game information and game indicia together with the scratch-off coating as is well known to one skilled in the art.

Figure 4:
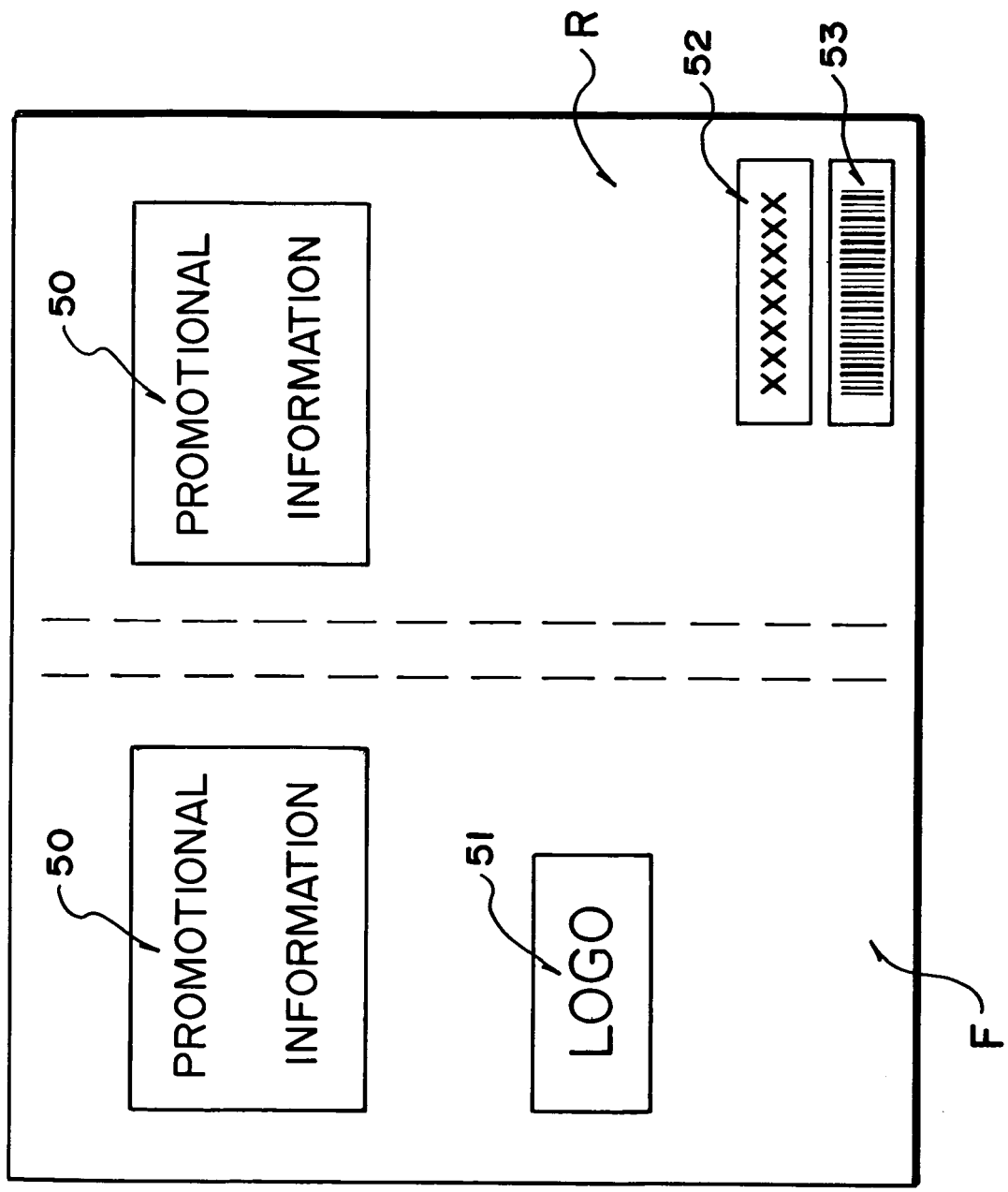
FIG. 4 is a rear elevational view of lottery ticket construction.

The front and rear pages shown in FIG. 4 contain promotional information 50 together with a logo 51.

Thus the construction provides in effect a booklet which has the appearance to the player of a booklet of a series of games. The theme of the booklet can be varied in accordance with the intentions of the game designer so that all of the games have some connected theme. This arrangement therefore provides at least six and possible eight surfaces on which different games can be provided. Some of the games can be connected one with the next to provide in effect a common game for example on the surfaces 31 and 33 shown in FIG. 3, the two games shown on those surfaces may be a common game having game information wholly on one surface and the game indicia wholly on the other surface or some part of each on both of the surfaces.

Alternatively each of the individual games on each of the surfaces may be separate from the others.

In FIG. 4, there is shown a printed validation number 52 and a bar code 53 which can be used for validating the ticket construction. In the example shown there is only one validation number and one bar code for the whole of the ticket construction but it will be appreciated that each individual ticket part may have its own individual bar code and validation number for the purposes of validating that particular element, should the player or the lottery require that one particular part or one of the substrate sheets be separated if that part is a winning ticket element.

While the preferred embodiments of the invention have been described above, it will be recognized and understood that various modifications may be made therein, and the appended claims are intended to cover all such modifications which may fall within the spirit and scope of the invention.

The invention claimed is:

1. A game ticket assembly comprising:
 a plurality of game ticket constructions each comprising:
  substrate sheet material;
  promotional graphics printed on the substrate sheet material;
  game information printed on the substrate sheet material;
  and game indicia printed by variable image printing onto the substrate sheet material;
  some or all of the game indicia being covered by a layer of scratch-off material removable by the player;
  the substrate sheet material comprising:
  a first substrate sheet having a front surface and a rear surface;
  a second substrate sheet having a front surface and a rear surface;
  the first substrate sheet being arranged with the rear surface thereof overlying the front surface of the second substrate sheet;
  and fastening material fastening the overlying first and second substrate sheets together along a line extending thereacross, the line being spaced from side edges of the first substrate sheet so as to define two parts of the first substrate sheet one on each side of the line and the line being spaced from side edges of the second substrate sheet so as to define two parts of the second substrate sheets one on each side of the line;
  the first and second substrate sheets defining a first side edge and a second side opposed edge with the first side edge of the first substrate sheet overlying the first side edge of the second substrate sheet and with the second side edge of the first substrate sheet overlying the second side edge of the second substrate sheet;
  the first and second substrate sheets being completely separate sheets which are subsequently joined together at said line;
  such that the first substrate sheet can be folded about the line to bring the two parts of the front surface thereof together;
  and the second substrate sheet can be folded around the first substrate sheet to bring the front surface of two parts of the second substrate sheet into contact with the rear surface of respective ones of the parts of the first substrate sheet;
  the two parts of the first substrate sheet and the two parts of the second substrate sheet being separate each from the others except along the line so as to form a booklet of four sheets and eight surfaces defined by the two parts of the first substrate sheet and the two parts of the second substrate sheet;
  with the two parts of the rear surface of the second substrate sheet exposed as outside surfaces of the booklet;
  the promotional graphics being printed on at least one part of said rear surface of the second substrate sheet;
  the game information being printed on at least some of the eight surfaces;
  the game indicia being printed by variable image printing onto at least some of the eight surfaces, with some or all of the game indicia being covered by the layer of scratch-off material removable by the player;
 wherein the game ticket constructions are connected each to the next at a junction therebetween located at the first side edges of the first and second substrate sheets of a first one of the game ticket constructions and the second side edges of the first and second substrate sheets of a next adjacent game ticket constructions to form a continuous row of the game ticket constructions;
 wherein at the junction the first substrate sheet of the first one of the game ticket constructions is connected to the first substrate sheet of the next adjacent game ticket construction and the second substrate sheet of the first one of the game ticket constructions is connected to the second substrate sheet of the next adjacent game ticket construction; and
 wherein the game ticket constructions each have a transverse row of perforations along the first and second substrate sheets at the junction for separation by tearing of the game ticket constructions for dispensing.

2. The lottery game ticket assembly according to claim 1 wherein the first and second substrates are coextensive.

3. The lottery game ticket assembly according to claim 1 wherein the line is arranged along a mid line of the first and second substrate sheets such that the two parts of each of the first and second substrate sheets are of the same dimensions and coextensive.

4. The lottery game ticket assembly according to claim 1 wherein the first and second substrate sheets are rectangular.

5. The lottery game ticket assembly according to claim 1 wherein fastening material comprises a band of adhesive.

6. The lottery game ticket assembly according to claim 5 wherein the band of adhesive is continuous.

7. The lottery game ticket assembly according to claim 1 wherein fastening material comprises a band of adhesive located solely between the first and second substrate sheets so that the front surface of the first substrate sheet is free from adhesive.

8. The lottery game ticket assembly according to claim 1 wherein each surface which has a game indicia printed thereon has the game indicia unrelated to those game indicia on each of the other surfaces so as to form a booklet of different games.

9. The lottery game ticket assembly according to claim 1 wherein each part of the rear surface of the second substrate sheet which forms the front and rear respectively of the booklet when folded is free from game indicia.

10. The lottery game ticket assembly according to claim 1 wherein at least the first substrate sheet has game indicia on each of the four surfaces defined by the two parts thereof.

11. The lottery game ticket assembly according to claim 1 wherein each of the surfaces of the parts of the first and second substrate sheets has game indicia thereon with the exception of the rear surface of the second substrate sheet defining the first and last surfaces of the booklet.

12. The lottery game ticket assembly according to claim 1 wherein the first and second substrate sheets are supplied in an initial condition for dispensing in a flat unfolded condition.

13. The game ticket assembly according to claim 1 wherein the game ticket constructions are arranged with the junction at right angles to the line.

14. The lottery game ticket assembly according to claim 1 wherein there are only two sheets.

15. The game ticket construction according to claim 1 wherein there are only two sheets.

16. The game ticket construction according to claim 1 wherein at least some of the game indicia are arranged relative to the game information to provide an instant win lottery game to be played by the player where the result of whether the lottery game is a winning or losing lottery game is predetermined and wherein at least one of the eight surfaces has printed thereon a bar code arranged for validating when the game indicia relate to a winning lottery game.

* * * * *